US010488045B2

(12) United States Patent
Peters et al.

(10) Patent No.: US 10,488,045 B2
(45) Date of Patent: Nov. 26, 2019

(54) FLOW ELEMENT AND METHOD FOR COATING A FLOW ELEMENT

(71) Applicant: Lufthansa Technik AG, Hamburg (DE)

(72) Inventors: Jan Oke Peters, Hamburg (DE); Thomas Gartner, Hamburg (DE); Oliver Winter, Hamburg (DE); Stefan Kuntzagk, Hamburg (DE); Tim Luebcke, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 16/081,046

(22) PCT Filed: Feb. 27, 2017

(86) PCT No.: PCT/EP2017/054459
§ 371 (c)(1),
(2) Date: Aug. 30, 2018

(87) PCT Pub. No.: WO2017/148843
PCT Pub. Date: Sep. 8, 2017

(65) Prior Publication Data
US 2019/0078783 A1 Mar. 14, 2019

(30) Foreign Application Priority Data
Mar. 1, 2016 (DE) .................. 10 2016 103 664

(51) Int. Cl.
*F23R 3/00* (2006.01)
*F01D 5/28* (2006.01)
(Continued)

(52) U.S. Cl.
CPC ............... *F23R 3/002* (2013.01); *F23M 5/00* (2013.01); *F23R 3/007* (2013.01); *F01D 5/288* (2013.01);
(Continued)

(58) Field of Classification Search
CPC . F23R 3/02; F23R 3/002; F23R 3/007; F23M 5/00; F23M 5/02; F23M 2900/05004; F01D 5/288
See application file for complete search history.

(56) References Cited

U.S. PATENT DOCUMENTS 4,055,705 A * 10/1977 Stecura ................ B23K 20/233
428/633
4,326,011 A * 4/1982 Goebel ................. C23C 28/023
428/641
(Continued)

FOREIGN PATENT DOCUMENTS

DE 102011103731 A1 12/2012
DE 102012015586 A1 5/2014
(Continued)

*Primary Examiner* — Andrew H Nguyen
(74) *Attorney, Agent, or Firm* — Leydig, Voit & Mayer, Ltd.

(57) ABSTRACT

A flow element for fluidic contact with a hot gas flow inside an aircraft engine includes: a base material, which has a hot gas surface that faces the gas flow and a remote surface that is remote from the gas flow, the base material being completely surrounded by a chroming layer on the hot gas surface and on the remote surface; an adhesive layer on the chroming layer in first portions; an alitising layer, the alitising layer being arranged on the adhesive layer in the first portions; and a thermal barrier layer being arranged on the alitising layer in the first portions. The alitising layer is arranged on the chroming layer in second portions that do not have an adhesive layer, the chroming layer and the alitising layer forming a chroming-alitising layer in the second portions.

10 Claims, 1 Drawing Sheet

(51) Int. Cl.
  *F23M 5/00*   (2006.01)
  *F16L 59/02*   (2006.01)
  *F23R 3/02*   (2006.01)

(52) U.S. Cl.
  CPC .. *F16L 59/029* (2013.01); *F23M 2900/05004* (2013.01); *F23R 3/02* (2013.01); *Y02T 50/6765* (2018.05)

(56) References Cited

U.S. PATENT DOCUMENTS

| | | | |
|---|---|---|---|
| 6,296,447 B1 * | 10/2001 | Rigney | C23C 4/00 |
| | | | 416/241 R |
| 9,109,279 B2 | 8/2015 | Chandra et al. | |
| 9,689,270 B2 | 6/2017 | Pillhoefer et al. | |
| 2008/0226871 A1 * | 9/2008 | Klein | C23C 14/042 |
| | | | 428/138 |
| 2014/0044986 A1 | 2/2014 | Pillhoefer et al. | |
| 2014/0141276 A1 | 5/2014 | Czech et al. | |
| 2015/0064430 A1 | 3/2015 | Doebber | |
| 2016/0281513 A1 * | 9/2016 | Kirby | F01D 5/288 |
| 2016/0320059 A1 * | 11/2016 | Pearson | B05D 1/02 |
| 2018/0058228 A1 * | 3/2018 | Berger | C23C 10/14 |
| 2018/0355477 A1 * | 12/2018 | Kojovic | C23C 4/02 |
| 2019/0078783 A1 * | 3/2019 | Peters | F23M 5/00 |

FOREIGN PATENT DOCUMENTS

| | | |
|---|---|---|
| DE | 102005060243 A1 | 6/2014 |
| DE | 102013217627 A1 | 3/2015 |
| EP | 2641993 A2 | 9/2013 |

* cited by examiner

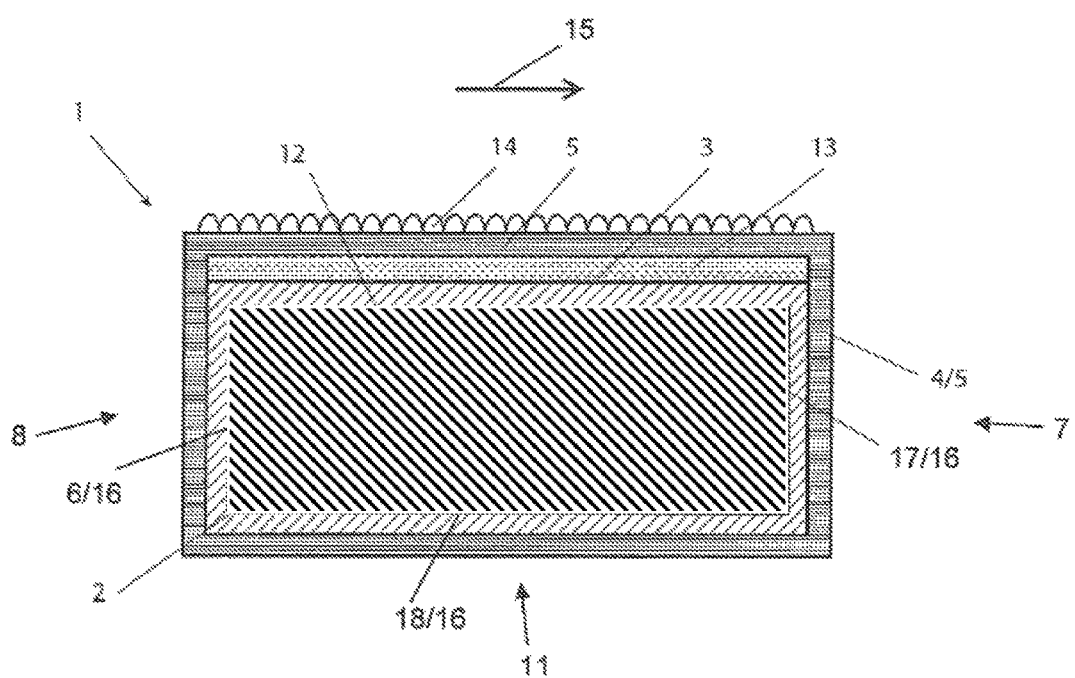

FLOW ELEMENT AND METHOD FOR COATING A FLOW ELEMENT

CROSS-REFERENCE TO PRIOR APPLICATIONS

This application is a U.S. National Stage Application under 35 U.S.C. § 371 of International Application No. PCT/EP2017/054459 filed on Feb. 27, 2017, and claims benefit to German Patent Application No. DE 10 2016 103 664.1 filed on Mar. 1, 2016. The International Application was published in German on Sep. 8, 2017 as WO 2017/148843 A1 under PCT Article 21(2).

FIELD

The present invention relates to a flow element for fluidic contact with a hot gas flow inside an aircraft and to a method for coating a flow element for an aircraft engine.

BACKGROUND

Flow elements, in the form of combustion chamber tile elements, consist of the base material that is protected by one or more coatings in order to extend the operating time. The base material of the combustion chamber tile element must in particular be protected from too high a temperature during operation, and therefore the coatings preferably function as thermal insulation. A combustion chamber is usually constructed having two shells. The chamber consists of a sheet metal housing, on the inside of which the combustion chamber tile elements are screwed, which elements thus form a closed combustion chamber. On the surface facing the sheet metal housing, also referred to as the rear face, the combustion chamber tile elements include a plurality of small pins for increasing the surface area. A cooling air mass flow flows between the sheet metal housing and the combustion chamber tile element, which mass flow flows around pins attached to the rear face of the combustion chamber tile element and thus cools the combustion chamber tile element. Surfaces of the combustion chamber tile element that are directly adjacent to the rear face are referred to as edge surfaces. The edge surface that faces in the flow direction of the fuel mixture is referred to as the outlet edge. The rear face and the edge surfaces are typically protected by means of an aluminium-based alitising diffusion coating. A surface of the combustion chamber tile element that faces the actual combustion chamber is protected from the high thermal stresses by means of an APS (atmospheric plasma spray) thermal barrier coating. The APS thermal barrier coating generally consists of an adhesive layer (MCrAlY) and a ceramic consisting of zirconium oxide ($ZrO_2$).

In the case of the combustion chamber tile elements described, the inventors have recognized that in particular two damage mechanisms arise that result in a reduction in the service life of the elements. A first damage mechanism is the corrosion of the outlet edge of the combustion chamber tile element, caused by thermal stresses. In the case of a second damage mechanism, local temperature peaks cause the APS thermal barrier layer on the surface facing the combustion chamber to chip, resulting in planar wear of the base material.

In order to address the above problem, monocrystal base materials are sometimes used today. The inventors have recognized, however, that the disadvantage of this solution is the high outlay for producing the monocyrstals and the associated high production costs.

SUMMARY

In an embodiment, a flow element for fluidic contact with a hot gas flow inside an aircraft engine is provided that includes: a base material, which has a hot gas surface that faces the gas flow and a remote surface that is remote from the gas flow, the base material being completely surrounded by a chroming layer on the hot gas surface and on the remote surface; an adhesive layer on the chroming layer in first portions; an alitising layer, the alitising layer being arranged on the adhesive layer in the first portions; and a thermal barrier layer being arranged on the alitising layer in the first portions. The alitising layer is arranged on the chroming layer in second portions that do not have an adhesive layer, the chroming layer and the alitising layer forming a chroming-alitising layer in the second portions.

BRIEF DESCRIPTION OF THE DRAWINGS

The present invention will be described in even greater detail below based on the exemplary FIGURE. The invention is not limited to the exemplary embodiments. Other features and advantages of various embodiments of the present invention will become apparent by reading the following detailed description with reference to the attached drawing which illustrates the following:

FIG. 1 is a cross sectional view of a flow element according to the invention.

DETAILED DESCRIPTION

Embodiments of the present invention provide a flow element and a method for the coating thereof, by means of which the hot-gas corrosion resistance is increased at low coating costs.

According to embodiments of the invention, a flow element for fluidic contact with a hot gas flow inside an aircraft engine is provided, the flow element including a base material that includes a hot gas surface that faces the gas flow, and a remote surface that is remote from the gas flow, the base material being completely surrounded by a chroming layer on the hot gas surface and on the remote surface, the flow element including an adhesive layer on the chroming layer in first portions, the flow element including an alitising layer, the alitising layer being arranged on the adhesive layer in the first portions, a thermal barrier layer being arranged on the alitising layer in the first portions, and the alitising layer being arranged on the chroming layer in second portions that do not include an adhesive layer, the chroming layer and the alitising layer forming a chroming-alitising layer in the second portions.

The flow element is preferably cuboid, such that the hot gas surface is preferably formed by a first lateral surface of the cuboid which faces the gas flow when mounted. The remote surface is then preferably formed by the remaining five lateral surfaces of the cuboid. However, an embodiment of the present invention explicitly also includes flow elements that have a geometry different from a cuboid. The flow element is preferably formed by a combustion chamber element of a combustion chamber of a gas turbine, more preferably by a combustion chamber tile element.

The coating sets the Al content so as to be as low as possible and to thus increases the resistance to cracking induced by thermo-mechanical fatigue (TMF). In addition, the coating according to the invention increases the Cr content in the edge region of the base material, as a result of which the resistance to sulphate-induced corrosion is increased. This adjustment of the Al and Cr content can increase the service life of the flow element. This results in increased system reliability and reduced maintenance costs. The chroming layer or the chroming-alitising layer preferably has a Cr content of at most 40 wt. %, more preferably at most 35 wt. %, particularly preferably at most 30 wt. %. The lower limit for the Cr content is preferably at least 10 wt. %, more preferably at least 20 wt. %, particularly preferably at least 30 wt. %.

The chroming layer is preferably applied by chemical vapour deposition (CVD). In this case, the chromium preferably diffuses 150 μm into the base material, more preferably approximately 100 μm. In the case of the chroming-alitising layer, aluminium is in addition vaporised by chemical vapour deposition (CVD). In this case, the aluminium preferably diffuses 150 μm into the base material, more preferably approximately 100 μm.

The alitising layer in the first portions may also be formed by a platinum aluminide coating, by means of which higher resistance to oxidation can be achieved.

The platinum is then preferably applied to the adhesive layer galvanically or by PVD, alitising subsequently taking place. The platinum aluminide coating forms as a result of the aluminium diffusing in during the alitising. The alitising during the application of the platinum aluminide coating means that the coating is to be understood as an alitising layer within the meaning of embodiments.

The hot gas surface facing the gas flow can in particular be damaged by local temperature peaks caused by what are known as dilution jets. Arranging the chroming layer, the adhesive layer and the alitising layer between the base material and the thermal barrier layer forms a particularly heat-resistant protective layer.

The adhesive layer arranged between the chroming layer and the alitising layer is preferably formed by MCrAlY.

The thermal barrier layer is preferably a ceramic thermal barrier layer, for example consisting of zirconium oxide ($ZrO_2$). Alternatively, however, one or more thermal barrier layers having different chemical compositions are also possible.

The thermal barrier layer is preferably applied by means of thermal spraying. The thermal barrier layer is more preferably applied by means of physical vapour deposition (PVD) using an electron beam (EB-PVD).

Without the chroming layer, adhesive layer and alitising layer, chipping of the thermal barrier layer would result in planar wear of the base material. The particular advantage of this embodiment is therefore that, after the thermal barrier layer has chipped, the base material is additionally protected by the compound structure consisting of the chroming layer, adhesive layer and alitising layer.

It is furthermore proposed for the first portions to be assigned to the hot gas surface. The coating, according to the invention, of the first portions therefore faces the hot gas flow which highly stresses the flow element. The first portions can thus shield the base element from the high thermal stress as far as possible.

Accordingly, the second portions are assigned to the surface remote from the hot gas flow. As a result, the chroming-alitising layer is provided on a surface of the base material that is remote from the gas flow, as a result of which the less highly stressed lateral surfaces, remote from the gas flow, are also adequately protected.

An outlet edge formed by the lateral surfaces remote from the gas flow is also subjected to particularly high stresses adjacently to the hot gas surface. The outlet edge is preferably the edge around which the gas flow passing by flows last. Alternatively, in other words, the outlet edge forms the trailing edge of the flow element in the flow direction.

The high thermal stresses mean that equidistant, lateral cracks may form on the outlet edge. Furthermore, in specific flight conditions, the outlet edge is subjected to sulphate-induced corrosion. The cracks in the coating make it easier for corrosive media to access the base material, with the result that the combustion chamber tile element that is damaged at the outlet edge has to be replaced by new material. Applying the chroming-alitising layer to the outlet edge of the flow element makes it possible to reliably prevent this damage mechanism.

It is furthermore proposed for the Cr content to be higher than the Al content in the case of the chroming-alitising layer. This adjustment of the proportions of Al and Cr achieves sufficiently high resistance to the cracking induced by thermal stress.

In the case of the chroming-alitising layer, it is furthermore preferable for the Al content to be less than 20 wt. %, preferably less than 15 wt. %, more preferably at most 10 wt. %. In the case of the chroming-alitising layer, the lower limit for the Al content is preferably at least 5 wt. %, more preferably at least 10 wt. %.

According to the invention, a method for coating a flow element for an aircraft engine is also provided, the flow element including a base material, the base material of the flow element being completely coated with a chroming layer in a first method step, the chroming layer being coated in part with an adhesive layer in a second method step, and the chroming layer and the adhesive layer being completely coated with an alitising layer in a third method step.

Embodiments further provide for partial coating with a thermal barrier layer to take place in a fourth method step.

The coating of the second method step and of the fourth method step is preferably carried out in the same portions. This ensures that the adhesive layer is provided at the points at which the thermal barrier layer is provided.

It has furthermore been found to be advantageous for the first method step to be carried out by chemical vapour deposition and/or for the second method step to be carried out by thermal spraying and/or for the third method step to be carried out by chemical vapour deposition. The fourth method step is preferably carried out by means of thermal spraying or by means of physical vapour deposition using an electron beam.

The invention will be explained in the following, with reference to preferred embodiments and to the accompanying drawing.

FIG. 1 is a cross sectional view of an embodiment of a flow element 1 according to the invention. The flow element 1 preferably forms a combustion chamber element of a combustion chamber in an aircraft engine, more preferably a combustion chamber tile element. The core of the flow element 1 according to the invention is formed by a base material 2. Nickel- and cobalt-based superalloys, for example, are possible as the material for the base material 2.

If the flow element 1 is formed by a combustion chamber tile element, when mounted the element is screwed to a metal housing and protects the housing from the temperatures emitted during the combustion process which flow past the flow element 1 in a hot gas flow 15.

The gas flow 15 of the combustion gases is indicated by an arrow in FIG. 1, the flow direction of the gas flow 15 being indicated by the arrow direction.

The basic shape of the flow element 1 is preferably cuboid, although other geometries are also possible. When installed, a distinction is made between a hot gas surface 12 facing the gas flow 15 and a surface 16 remote from the gas flow 12, the remote surface 16 preferably including five lateral surfaces: a first lateral surface 6 that is oriented counter to the flow direction of the gas flow 15 and that forms an inlet edge 8; a second lateral surface 17 that faces in the flow direction and that forms an outlet edge 7; a third lateral surface 18 that is arranged opposite the hot gas surface 12 facing the gas flow 15 and that forms a rear face 11; and two lateral surfaces that are in parallel with the sectional plane of FIG. 1 and that are referred to as lateral edges.

Pins that are preferably orthogonal to the third subsurface 18 may be provided on the rear face 11 of the flow element 1, which pins increase the surface area on the rear face 11. The heat transfer to a cooling air mass flow that flows between the metal housing and the rear face 11 can thus be improved. The coating of the third protruding pins, if present, is also to be understood as a coating of the rear face 11.

In the embodiment of the invention shown in FIG. 1, the base material 2 is preferably surrounded on all sides by a chroming layer 3.

In first portions, an adhesive layer 13 is applied to the chroming layer 3, the adhesive layer preferably being an MCrAlY layer. Furthermore, the adhesive layer 13 is covered, in the first portion, by an alitising layer 5. As a final layer, in the first portions, a thermal barrier layer 14 is applied to the alitising layer 5, around which thermal barrier layer the gas flow 15 flows during operation.

In this case, the first portions are preferably formed by a thermally highly stressed surface of the flow element 1, more preferably by the hot gas surface 12.

The thermal barrier layer 14 is preferably a ceramic thermal barrier layer consisting of zirconium oxide ($ZrO_2$). It should be noted, however, that a thermal barrier layer 14 having a different chemical composition can also be used instead of a ceramic thermal barrier layer 14. The preferably ceramic thermal barrier layer 14 is preferably applied by means of thermal spraying or by means of physical vapour deposition using an electron beam.

In a second portion that does not include an adhesive layer 13 an alitising layer 5 is provided on the chroming layer 3, the chroming layer 3 and the alitising layer 5 together forming a chroming-alitising layer 4. The second portions are preferably formed by the remote surface 16.

The adhesive layer 13 is not directly connected to the base material 2, but instead connects the alitising layer 5 to the chroming layer 3. In the event of the thermal barrier layer 14 being damaged, for example on account of thermal stress, the base material 2 can still be protected by the advantageous compound structure consisting of the alitising layer 5, adhesive layer 13 and chroming layer 3.

In the case of the combustion chamber tile elements 1, sulphate-induced corrosion occurs mainly at the outlet edge 7. Coating the outlet edge 7 with the chroming-alitising layer 4 makes it possible to eliminate this problem and to thus increase the service life of the flow element 1.

The alitising fundamentally provides protection against oxidation which occurs at high temperatures; the chroming, in contrast, protects against hot-gas corrosion that occurs at low temperatures. The basic principle of the embodiments described is that the remote surface 16, in particular the inlet edge 8 and the outlet edge 7, can protect the flow element 1 from both oxidation and corrosion by the combination of the chroming/alitising layer 4. The flow element 1 can thus be reliably protected in a temperature range of from approximately 750° C. to 1200° C., which range is increased compared with conventional flow elements 1.

In the region of the combined chroming-alitising layer 4, it is advantageous to set the wt. % Cr content so as to be higher than the Al content. In this case, the Al content is preferably less than 20 wt. %, more preferably less than 15 wt. %, and particularly preferably less than 10 wt. %.

In a particularly preferred embodiment, in a first method step the chroming layer 3 is completely applied to the base material 2 of the flow element 1, i.e. is applied on all surfaces, preferably by means of chemical vapour deposition.

In a second method step, following the chroming an adhesive layer 13 is applied preferably in a first portion that is assigned to the hot gas surface 12. The adhesive layer 13 is preferably an MCrAlY layer. The adhesive layer 13 is preferably applied by means of thermal spraying.

In a third method step, the flow element 1 is preferably completely alitised, i.e. alitised both on the hot gas surface 12 and on the remote surface 16. More preferably, the alitising is carried out by means of chemical vapour deposition. The chroming-alitising layer 4 is thus formed on the remote surface 16.

Subsequently, in a fourth method step, the thermal barrier layer 14 is preferably applied to the hot gas surface 12. This is preferably carried out by means of thermal spraying or physical vapour deposition using an electron beam.

While the invention has been illustrated and described in detail in the drawing and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A flow element for fluidic contact with a hot gas flow inside an aircraft engine, the flow element comprising:
   a base material that comprises a hot gas surface that faces the hot gas flow, and a remote surface that is remote from the hot gas flow, the base material being completely surrounded by a chroming layer on the hot gas surface and on the remote surface;
an adhesive layer on the chroming layer in first portions;
an alitising layer, the alitising layer being arranged on the adhesive layer in the first portions; and
a thermal barrier layer being arranged on the alitising layer in the first portions,
wherein the alitising layer is arranged on the chroming layer in second portions comprising no said adhesive layer, the chroming layer and the alitising layer forming a chroming-alitising layer in the second portions;
wherein the first portions are at the hot gas surface and the second portions are at the remote surface.

2. The flow element according to claim 1, wherein, in the chroming-alitising layer, a Cr content is higher than an Al content.

3. The flow element according to claim 1, wherein, in the chroming-alitising layer, an Al content is less than 20 wt. %.

4. A method for coating a flow element for an aircraft engine, the flow element comprising a base material, the method comprising:
the base material comprises a hot gas surface that faces a hot gas flow, and a remote surface that is remote from the hot gas flow, the base material being completely surrounded by a chroming layer on the hot gas surface and on the remote surface;
in a first method step, the base material of the flow element is completely coated with the chroming layer;
in a second method step, the chroming layer is coated in part with an adhesive layer in first portions; and
in a third method step, the chroming layer and the adhesive layer are completely coated with an alitising layer;
wherein the alitising layer is arranged on the chroming layer in second portions comprising no said adhesive layer, the chroming layer and the alitising layer forming a chroming-alitising layer in the second portions;
wherein the first portions are at the hot gas surface and the second portions are at the remote surface.

5. The method according to claim 4, further comprising, in a fourth method step, partial coating with a thermal barrier layer is carried out.

6. The method according to claim 5, wherein the coating of the second method step and of the fourth method step is carried out in the first portions.

7. The method according to claim 4, wherein the first method step is carried out using chemical vapour deposition.

8. The method according to claim 4, wherein the second method step is carried out using thermal spraying.

9. The method according to claim 4, wherein the third method step is carried out using chemical vapour deposition.

10. The method according to claim 5, wherein the fourth method step is carried out using thermal spraying or using physical vapour deposition using an electron beam.

* * * * *